United States Patent [19]
Wallis et al.

[11] Patent Number: 5,358,391
[45] Date of Patent: Oct. 25, 1994

[54] HERMETIC COMPRESSOR WITH HEAT SHIELD

[75] Inventors: Frank S. Wallis; Timothy R. Houghtby; Kenneth J. Monnier, all of Sidney, Ohio; Roger C. Weatherston, East Amherst, N.Y.

[73] Assignee: Copeland Corporation, Sidney, Ohio

[21] Appl. No.: 95,185

[22] Filed: Jul. 23, 1993

Related U.S. Application Data

[60] Continuation-in-part of Ser. No. 978,947, Nov. 18, 1992, abandoned, and a continuation-in-part of Ser. No. 998,557, Dec. 30, 1992, which is a division of Ser. No. 884,412, May 18, 1992, Pat. No. 5,219,281, which is a division of Ser. No. 649,001, Jan. 31, 1991, Pat. No. 5,114,322, which is a division of Ser. No. 387,699, Jul. 31, 1989, Pat. No. 4,992,033, which is a division of Ser. No. 189,485, May 2, 1988, Pat. No. 4,877,382, which is a division of Ser. No. 899,003, Aug. 22, 1986, Pat. No. 4,767,293.

[51] Int. Cl.⁵ .................. F04C 18/04; F04C 29/04; F04B 39/06
[52] U.S. Cl. .................. 418/55.1; 418/83; 418/181; 417/313; 417/902
[58] Field of Search .................. 418/55.1, 83, 181; 417/313, 902

[56] References Cited

U.S. PATENT DOCUMENTS

| | | | |
|---|---|---|---|
| Re. 33,652 | 7/1991 | Yamamura et al. | 418/55.1 |
| 2,928,589 | 3/1960 | Davey | |
| 3,465,954 | 9/1969 | Ellis | |
| 3,802,809 | 4/1974 | Vulliez | 418/5 |
| 4,343,599 | 8/1982 | Kousokabe | 418/88 |
| 4,347,043 | 8/1982 | Morris | 417/53 |
| 4,383,805 | 5/1983 | Teegarden et al. | 417/308 |
| 4,435,137 | 3/1984 | Terauchi | 418/57 |
| 4,497,615 | 2/1985 | Griffith | 417/310 |
| 4,571,163 | 2/1986 | Sakamoto et al. | 418/57 |
| 4,609,334 | 9/1986 | Muir et al. | 418/57 |
| 4,696,630 | 9/1987 | Sakata et al. | 418/57 |
| 4,744,737 | 5/1988 | Yamamura et al. | 417/902 |
| 4,767,293 | 8/1988 | Caillat et al. | 418/57 |
| 4,781,542 | 11/1988 | Ozu et al. | 417/902 |
| 4,877,382 | 10/1989 | Caillat et al. | 418/57 |
| 4,904,165 | 2/1990 | Fraser, Jr. et al. | 417/312 |
| 4,904,169 | 2/1990 | Ichikawa | 418/55.2 |
| 4,929,160 | 5/1990 | Inoue | 418/181 |
| 4,958,993 | 9/1990 | Fujio | 418/55.3 |
| 4,992,033 | 2/1991 | Caillat et al. | 418/55.3 |
| 5,055,012 | 10/1991 | Sakashita et al. | 417/440 |
| 5,071,323 | 12/1991 | Sakashita et al. | 417/440 |

FOREIGN PATENT DOCUMENTS

| | | | |
|---|---|---|---|
| 58-62397 | 4/1983 | Japan | |
| 58-170877 | 10/1983 | Japan | |
| 59-119092 | 7/1984 | Japan | |
| 59-142485 | 9/1984 | Japan | |
| 59-41035 | 10/1984 | Japan | |
| 60-66892 | 5/1985 | Japan | |
| 60-145483 | 7/1985 | Japan | |
| 60-180785 | 11/1985 | Japan | |
| 60-249683 | 12/1985 | Japan | |
| 61-40473 | 2/1986 | Japan | 418/55.1 |
| 61-178589 | 8/1986 | Japan | |
| 61-182482 | 8/1986 | Japan | |
| 61-197782 | 9/1986 | Japan | |
| 61-205386 | 9/1986 | Japan | |
| 61-265377 | 11/1986 | Japan | |
| 62-17391 | 1/1987 | Japan | |
| 62-31785 | 2/1987 | Japan | |
| 63-2891 | 1/1988 | Japan | |
| 63-150489 | 6/1988 | Japan | |
| 63-110685 | 7/1988 | Japan | |
| 63-192984 | 8/1988 | Japan | |
| 64-8389 | 1/1989 | Japan | |
| 64-32089 | 2/1989 | Japan | |
| 64-36691 | 3/1989 | Japan | |
| 64-44386 | 3/1989 | Japan | |
| 64-44387 | 3/1989 | Japan | |
| 64-56981 | 3/1989 | Japan | |
| 1147185 | 6/1989 | Japan | |
| 1170780 | 7/1989 | Japan | |
| 1170781 | 7/1989 | Japan | |
| 1144484 | 10/1989 | Japan | |
| 1166288 | 11/1989 | Japan | |
| 1285689 | 11/1989 | Japan | |
| 2227579 | 9/1990 | Japan | |

Primary Examiner—John J. Vrablik
Attorney, Agent, or Firm—Harness, Dickey & Pierce

[57] ABSTRACT

A heat shield is disposed in a hermetic compressor between a discharge port and a local area on an interior surface of the outer shell toward which relatively hot compressed gas is directed. The local area of the outer shell is thereby insulated from the high temperature of the discharge gas.

10 Claims, 4 Drawing Sheets

HERMETIC COMPRESSOR WITH HEAT SHIELD

CROSS-REFERENCE TO RELATED APPLICATIONS

The present invention is a continuation-in-part of Ser. No. 07/978,947, filed Nov. 18, 1992, now abandoned, and Ser. No. 07/998,557, (pending) filed Dec. 30, 1992, which is a division of Ser. No. 07/884,412, filed May 18, 1992, now U.S. Pat. No. 5,219,281, which is a division of Ser. No. 07/649,001, filed Jan. 31, 1991, now U.S. Pat. No. 5,114,322, which is a division of Ser. No. 07/387,699, filed Jul. 31, 1989, now U.S. Pat. No. 4,992,033, which is a division of Ser. No. 07/189,485, filed May 2, 1988, now U.S. Pat. No. 4,877,382, which is a division of Ser. No. 06/899,003, filed Aug. 22, 1986, now U.S. Pat. No. 4,767,293, which relate generally to hermetic compressors, and more particularly to a hermetic compressor having a heat shield to prevent localized hot spots on the shell.

BACKGROUND AND SUMMARY OF THE INVENTION

Several types of hermetic gas compressors, such as scroll compressors and certain other rotary compressors, have a discharge port positioned so that relatively hot compressed gas is discharged toward a local area on the interior surface of the hermetic shell in which the compressor is disposed. The compressed discharge gas is generally relatively hot. However, under certain conditions, such as a loss of charge, system blocked fan operation, or transient operation at a high compression ratio, the discharge gas may become exceedingly hot. If this hot compressed gas impinges on the interior surface of the shell, an undesirable localized hot spot is formed, which can present a hazardous situation as well as reduce the strength and durability of the shell material.

It is therefore an object of the present invention to provide a heat shield to insulate the shell from the relatively hot discharge gas and overcome the problems of the prior art.

These and other various advantages and features of the present invention will become apparent from the following description and claims, in conjunction with the appended drawings:

DETAILED DESCRIPTION OF THE PREFERRED EMBODIMENTS

The following description of the preferred embodiments is merely exemplary in nature, and is in no way intended to limit the invention, or its application or uses.

Figure 1:
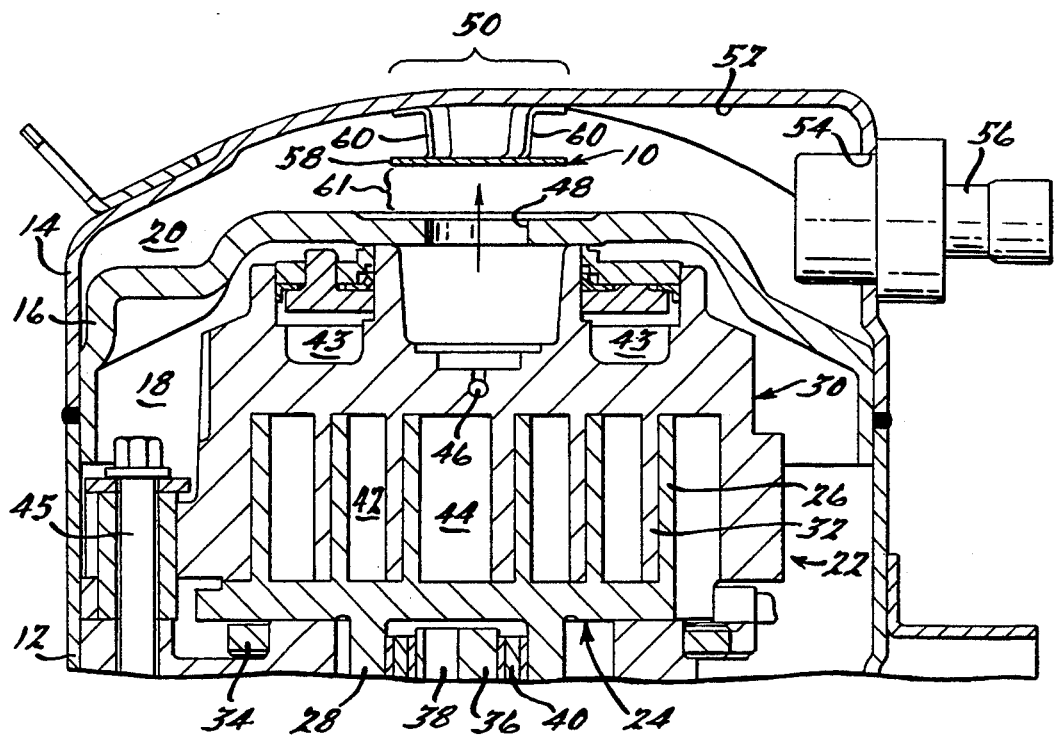
FIG. 1 is a partial cross-sectional view of a hermetic compressor incorporating the principles of the present invention, taken along line 1—1 in FIG. 3.
Figure 2:
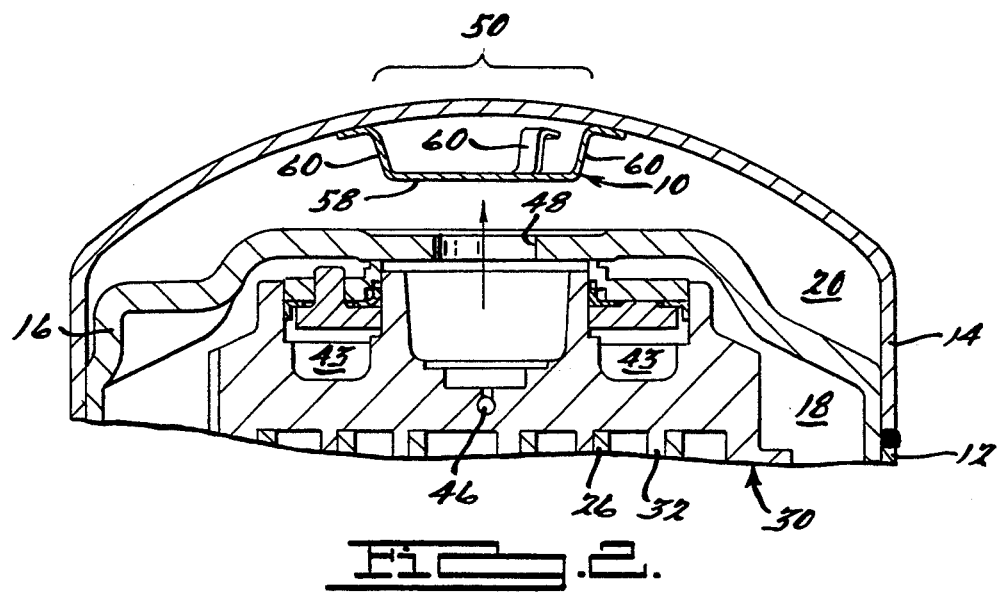
FIG. 2 is a view similar to FIG. 1 taken along line 2—2 in FIG. 3.
Figure 3:
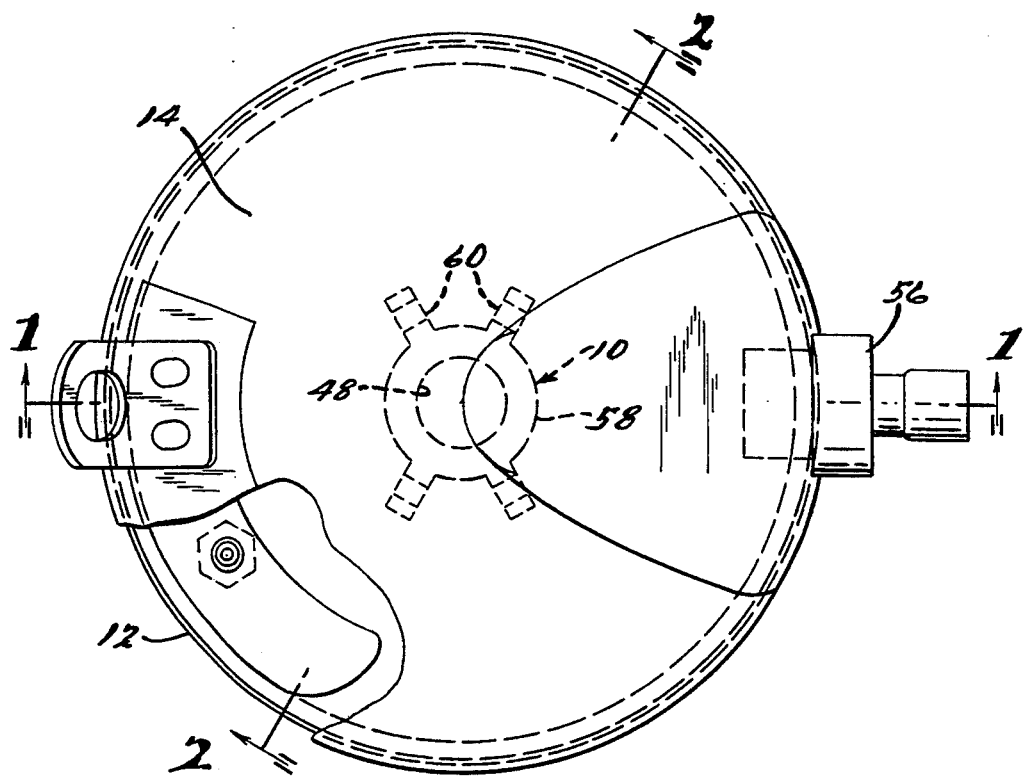
FIG. 3 is a top plan view of a hermetic compressor according to the present invention.

With reference to the drawings, a hermetic compressor is shown in FIGS. 1–3 having a novel heat shield 10 according to the present invention. Although the compressor is depicted as a scroll compressor, the heat shield 10 of the present invention 76 may be utilized with any compressor having a discharge port which can direct hot discharge of gas against the interior surface of the hermetic shell. The compressor of FIGS. 1–3 is constructed of an exterior shell consisting of a sidewall 12 and a top cap 14 which are hermetically sealed together to define an enclosed chamber, with a muffler plate 16 dividing the enclosed chamber into a compressor chamber 18 and a muffler chamber 20. A motor-compressor assembly 22 is contained within compressor chamber 18, and includes an orbiting scroll member 24 having a spiral wrap 26 and an axially extending boss 28, a non-orbiting scroll member 30 having a spiral wrap 32, an Oldham coupling 34, an eccentric portion of a drive shaft 36 having an oil passage 38, and a bushing 40 adapted for rotation within boss 28.

The compressor is similar to that disclosed in applicants' assignee's U.S. Pat. No. 5,102,316, the disclosure of which is hereby incorporated herein by reference. Drive shaft 36 rotates and causes orbiting scroll member 24 to engage in orbiting motion, while Oldham coupling 34 prevents orbiting scroll member 24 from rotating about its own axis. Spiral wraps 26 and 32 are interleaved and cooperate to form at least one compression space 42. As orbiting scroll 24 orbits, gas at suction pressure is drawn into compression space 42. The gas moves inwardly and the volume of compression space 42 decreases, thus compressing the gas. A small backpressure passage (not shown) is formed in the end plate of non-orbiting scroll member 30 which leads from compression space 42 to a backpressure chamber 43, for axially biasing non-orbiting scroll member 30 toward orbiting scroll member 24. Non-orbiting scroll member 30 is allowed to shift axially by a mounting arrangement which includes mounting bolt 45. The compressed gas reaches discharge pressure in discharge pressure chamber 44, proceeds through outlet tube 46, and then passes through discharge port 48. The compressed gas at discharge pressure is discharged into muffler chamber 20 in a direction shown by the arrow in FIG. 1 toward a local area 50 defined on an interior surface 52 of cap 14. Finally, the compressed gas exits muffler chamber 20 through muffler exit port 54 and a one-way discharge valve 56.

Figure 4:
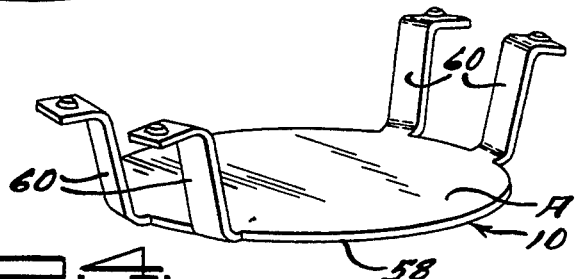
FIG. 4 is a perspective view of a heat shield according to the present invention.

The novel heat shield 10 of the present invention is disposed between discharge port 48 and local area 50 to insulate cap 14 from the relatively high temperature of the discharge gas. Heat shield 10 may be formed, as is shown in FIG. 4, as a sheet metal baffle having a plate-shaped deflector portion 58 and a plurality of legs 60. Legs 60 are bent so that deflector portion 58 of heat shield 10 may be spaced from cap 14 to reduce heat transfer from deflector portion 58 to cap 14 by conduction. Heat shield 10 is disposed a sufficient distance 61 from discharge port 48 to facilitate relatively unrestricted discharge flow, or at least not to restrict the discharge flow substantially more than in the absence of heat shield 10. The distance between discharge port 48 and heat shield 10 should preferably be greater than one-quarter of the hydraulic diameter of the port facing heat shield 10, which is discharge port 48 in the embodiment of FIGS. 1–3. The hydraulic diameter is defined as the square root of the following quantity: four multiplied by the perimeter of the port which faces heat shield 10 (discharge port 48) divided by the cross-sectional area of discharge port 48.

In addition, heat shield 10 defines a maximum effective insulating area which is approximately the area A of plate shaped deflector portion 58. This maximum effective insulating area may be no greater than 2 times a maximum cross-sectional dimension of the port facing heat shield 10, which is discharge port 48 in the embodiment of FIGS. 1–3.

Because heat shield 10 is preferably effective to reduce the temperature of local area 50° below 392° F., area A is preferably selected to be no larger than necessary to do so.

Figure 5:
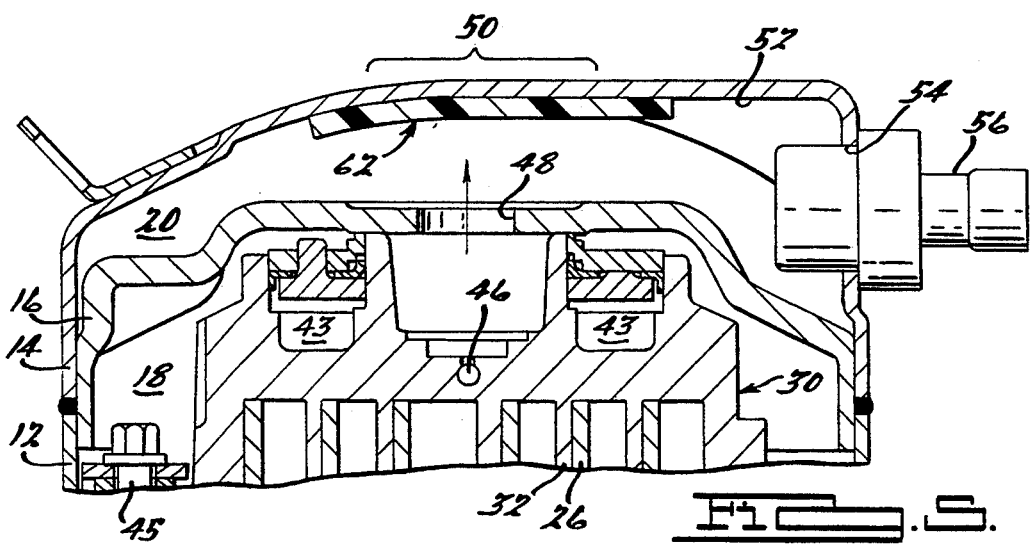
FIG. 5 is a partial cross-sectional view similar to FIG. 1 showing an alternative embodiment of the present invention.

An alternative embodiment of the present invention is shown in FIG. 5, in which identical reference numerals represent similar features. Heat shield 62 is formed as a layer of material which has an insulating effect, and is affixed to interior surface 52 of cap 14. Heat shield 62 may be formed of a variety of insulating materials, for example a polymer such as PEEK, or a ceramic such as partially stabilized zirconia. Heat shield 62 is positioned to cover local area 50 and insulate cap 14 from the relatively hot discharge gases flowing through discharge port 48. Heat shield 62 is preferably formed having a maximum effective insulating area which is no greater than 2 times a maximum cross-sectional dimension of discharge port 48.

Figure 6:
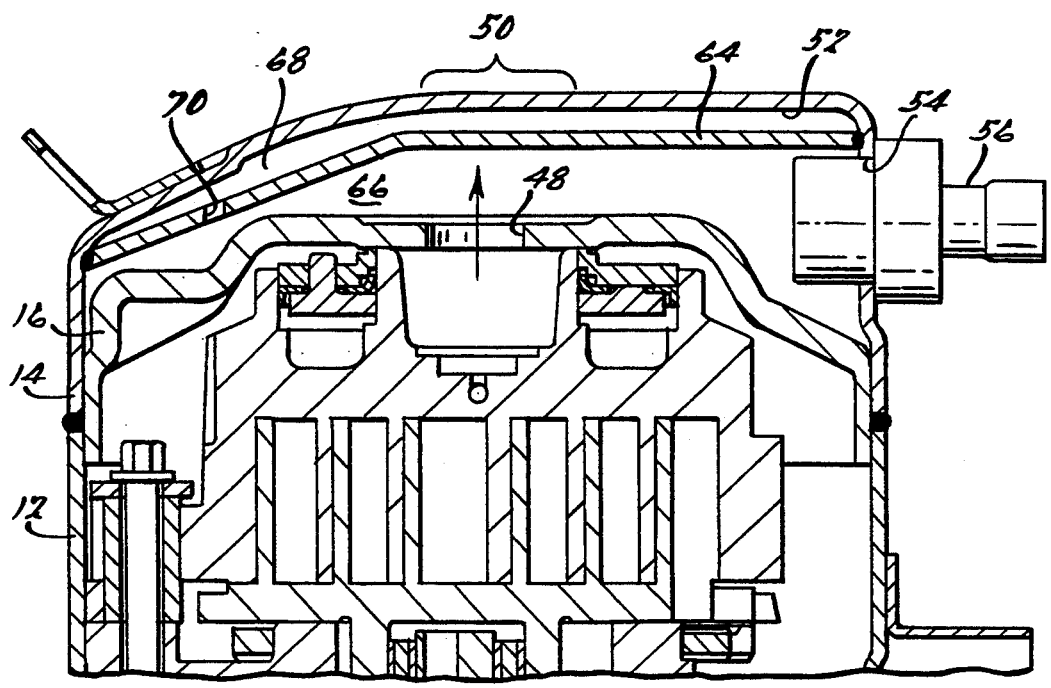
FIG. 6 is a partial cross-sectional view of a second alternative embodiment of the present invention.

A second alternative embodiment of the present invention is depicted in FIG. 6, in which the compressor includes a heat shield 64 which is formed as a diaphragm extending across a majority of the interior surface 52 of cap 14. Heat shield 64 segregates the volume of cap 14 into a discharge or plenum chamber 66 and an insulating chamber 68. Insulating chamber 68 contains relatively stagnant or non-moving gas which tends to insulate cap 14, and especially local area 50, from the relatively hot discharge gas. Heat shield 64 may also be formed with a vent passage 70 for balancing the pressures of the gas within plenum chamber 66 and insulating chamber 68, so that heat shield 64 need not be constructed to withstand the full discharge pressure produced by the compressor. Insulating chamber 68 has no other exit besides vent passage 70, so that the discharge gas flows generally from discharge port 48 to exit port 54, and not through vent passage 70. As a result, heat shield 64 is formed having no flow passage in a discharge flow path between discharge port 48 and exit port 54.

Figure 7:
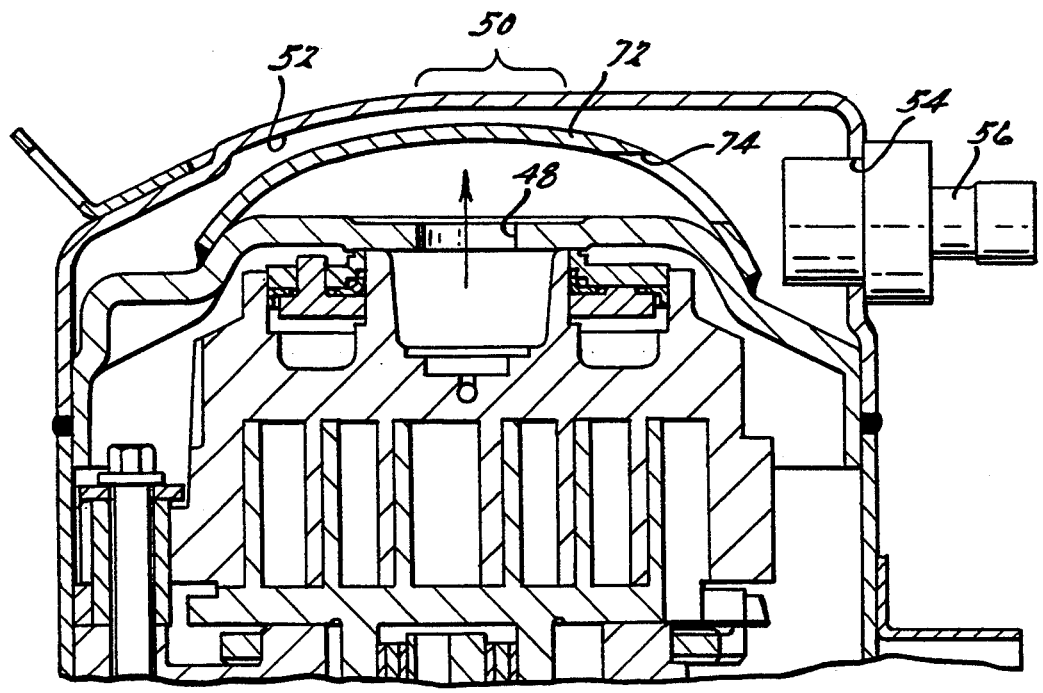
FIG. 7 is a partial cross-sectional view of a third alternative embodiment of the present invention.

A third alternative embodiment of the present invention is shown in FIG. 7, wherein the compressor includes a heat shield 72 which is affixed to muffler plate 16 and is disposed between discharge port 48 and local area 50. Heat shield 72 has an opening 74 which allows the compressed discharge gas to pass therethrough, along a flow path between discharge port 48 and exit port 54.

Figure 8:
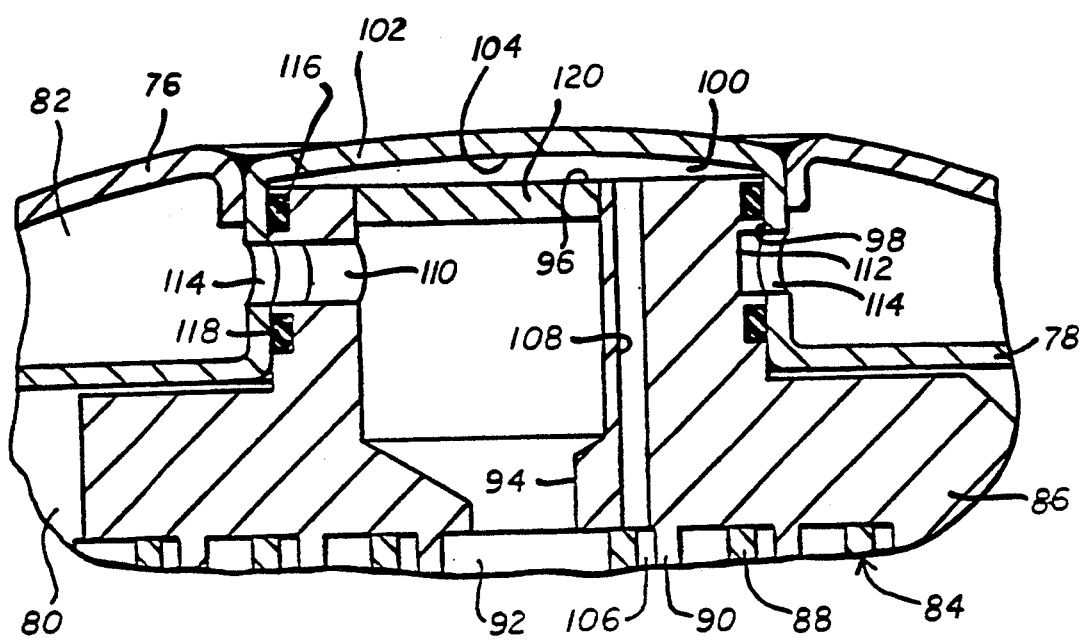
FIG. 8 is an enlarged fragmentary vertical sectional view illustrating another embodiment of the present invention.

In the embodiment of FIG. 8, a scroll machine is shown which is constructed of an exterior shell consisting of a sidewall (not shown) and a top cap 76 which are hermetically sealed together, with a muffler plate 78 dividing the enclosed chamber into a compressor chamber 80 and a plenum chamber or discharge chamber 82.

A compressor assembly is disposed within compressor chamber 80 and includes an orbiting scroll member 84 and a non-orbiting scroll member 86, each incorporating a spiral wrap 88 and 90 respectively. Orbiting and non-orbiting scroll members 84 and 86 cooperate to define a central chamber 92, which encloses a region of relatively high discharge pressure when the scroll machine is operated as a compressor. Non-orbiting scroll member 86 is provided with a discharge port 94 which communicates through a discharge passage with plenum chamber or muffler chamber 82, from which the compressed gas exits the scroll machine through an exit port (not shown).

Axial biasing is achieved through the use of compressed fluid at an intermediate pressure which is between suction and discharge pressure. This is accomplished by providing a piston face 96 on the top of non-orbiting scroll member 86, which is adapted to slide axially within a sleeve or cylinder chamber 98, defined by muffler plate 78. Of course, the opposite arrangement is possible, in which a sleeve or cylinder is adapted to slide axially with respect to a fixed piston face. A downpressure chamber 100 is defined by piston face 96 and a central portion 102 of muffler plate 78. Central portion 102 spans the area between the walls of cylinder 98, and is welded around its perimeter to top cap 14. Central portion 102 of muffler plate 78 thus forms the top center portion of the hermetic compressor exterior shell, and defines a local area 104 toward which the relatively hot discharge gas is directed. Downpressure chamber 100 is maintained at the intermediate pressure by tapping compressed fluid from an intermediate compression space 106 defined by spiral wraps 88 and 90, through a passage 108 to chamber 100. Downpressure chamber 100 thus promotes tip sealing by pressing non-orbiting scroll member 86 axially down into engagement with orbiting scroll member 84.

Discharge fluid flows from central chamber 92 through discharge port 94 into a radial passage 110 in non-orbiting scroll member 86 which connects with an annular groove 112, which is in direct communication with a series of openings 114 and discharge chamber 82. Elastomeric seals 116 and 118 provide the necessary sealing between discharge chamber 82 and both compressor chamber 80 and downpressure chamber 100.

In accordance with the principles of the present invention, a novel heat shield 120 is provided in the direct path of the relatively hot discharge gas, between discharge port 94 and local area 104. Heat shield 120 is preferably a planar disk affixed to an upper central portion of non-orbiting scroll member 86. Heat shield 120 is therefore disposed between downpressure chamber 100 and discharge port 94, where it serves the dual purposes of acting as a portion of piston face 96 for axially biasing non-orbiting scroll member 86 downwardly, as well as thermally insulating and protecting local area 104 for preventing a localized hot spot in the center of the exterior shell of the scroll machine.

It should be understood that an unlimited number of configurations of the present invention can be realized. The foregoing discussion discloses and describes merely exemplary embodiments of the present invention. One skilled in the art will readily recognize from the discussion and from the accompanying drawings and claims that various changes and modifications can be made without departing from the spirit and scope of the invention, as defined in the following claims.

What is claimed is:

1. A hermetic compressor comprising:
   (a) a hermetic shell defining an enclosed chamber and having an exit port;
   (b) a gas compressor disposed in said chamber having a discharge port from which relatively hot compressed gas is discharged, said discharge port being positioned so that said hot compressed gas is discharged in a direction toward a local area on an interior surface of said shell, said exit port being spaced from said local area; and
   (c) a heat shield having a substantially planar baffle and a plurality of support members for affixing said baffle to said shell and for spacing said baffle from said shell, said heat shield being disposed between said discharge port and said local area to insulate said shell from the relatively high temperature of said discharge gas, said baffle being disposed a sufficient distance from said discharge port to facilitate relatively unrestricted discharge flow, said baffle being formed having no flow passage in a flow path between said discharge port and said exit port.

2. The hermetic compressor as claimed in claim 1, wherein said distance is greater than one quarter of a hydraulic diameter of said port.

3. The hermetic compressor as claimed in claim 1, wherein said heat shield has a maximum effective insulating area no greater than two and one-half times a maximum cross-sectional dimension of said discharge port.

4. The hermetic compressor as claimed in claim 1, wherein said heat shield comprises sheet metal forming said baffle and said support members.

5. The hermetic compressor as claimed in claim 1, wherein said heat shield is effective during normal operation to reduce a temperature of said local area below 392 degrees fahrenheit.

6. The hermetic compressor as claimed in claim 5, wherein said shield is no larger than necessary to reduce said temperature to 392 degrees fahrenheit during normal operation.

7. A hermetic compressor comprising:
   (a) a hermetic shell defining an enclosed chamber and having an exit port;
   (b) a gas compressor disposed in said chamber having a discharge port from which relatively hot compressed gas is discharged into a discharge muffler, said discharge port being positioned so that said hot compressed gas is discharged in an axial direction toward a local area on an interior surface of said shell, said exit port being spaced from said local area; and
   (c) a heat shield formed as a sheet metal baffle disposed between said discharge port and said local area to insulate said shell from the relatively high temperature of said discharge gas, said baffle being spaced from said shell and being disposed a sufficient distance from said discharge port to facilitate relatively unrestricted discharge flow, said baffle having a plate-shaped deflector portion and a plurality of members for spacing said deflector portion from said shell and for affixing said deflector portion to same.

8. The hermetic compressor as claimed in claim 7, wherein said distance is greater than one quarter of a hydraulic diameter of said discharge port.

9. The hermetic compressor as claimed in claim 7, wherein said heat shield has a maximum effective insulating area no greater than two and one-half times a maximum cross-sectional dimension of said discharge port.

10. The hermetic compressor as claimed in claim 7, said shield being disposed in said muffler and being sized so as not to significantly reduce the volume and effectiveness of said muffler.

* * * * *

UNITED STATES PATENT AND TRADEMARK OFFICE
CERTIFICATE OF CORRECTION

PATENT NO. : 5,358,391
DATED : October 25, 1994
INVENTOR(S) : Frank S. Wallis; Timothy R. Houghtby; Kenneth J. Monnier; Roger C. Weatherston It is certified that error appears in the above-indentified patent and that said Letters Patent is hereby corrected as shown below:

Column 2, line 11, delete "76".

Column 3, line 12, "2" should be -- 2-1/2 --.

Column 3, line 17, "50°" should be -- 50 --.

Column 3, line 32, "2" should be -- 2-1/2 --.

Signed and Sealed this

Twenty-eight Day of February, 1995

Attest:

BRUCE LEHMAN

*Attesting Officer*     *Commissioner of Patents and Trademarks*